United States Patent
Youn et al.

(10) Patent No.: US 7,751,631 B2
(45) Date of Patent: Jul. 6, 2010

(54) BYPASS USING SUM OF ABSOLUTE TRANSFORMED DIFFERENCES VALUE (SATD) IN A VIDEO CODING PROCESS

(75) Inventors: Jeongnam Youn, San Jose, CA (US); Cheung Auyeung, Sunnyvale, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 865 days.

(21) Appl. No.: 11/644,813

(22) Filed: Dec. 22, 2006

(65) Prior Publication Data
US 2008/0151999 A1  Jun. 26, 2008

(51) Int. Cl.
*G06K 9/36* (2006.01)
(52) U.S. Cl. ...................................... 382/232; 382/236
(58) Field of Classification Search ......... 382/232–253; 375/240.01–240.27
See application file for complete search history.

(56) References Cited

U.S. PATENT DOCUMENTS

| | | | | |
|---|---|---|---|---|
| 6,721,359 | B1 * | 4/2004 | Bist et al. | 375/240.03 |
| 7,123,654 | B2 * | 10/2006 | Song | 375/240.02 |
| 7,177,359 | B2 * | 2/2007 | Song et al. | 375/240.16 |
| 2004/0264575 | A1 | 12/2004 | Bjontegaard | |
| 2006/0039470 | A1 | 2/2006 | Kim et al. | |
| 2009/0168870 | A1 * | 7/2009 | Morimoto | 375/240.03 |

FOREIGN PATENT DOCUMENTS

| | | |
|---|---|---|
| EP | 1 845 731 A1 * | 4/2006 |
| WO | WO 2006047936 A1 | 5/2006 |

OTHER PUBLICATIONS

Kim, Gyu Yeong et al; An Early Detection of All-Zero DCT Blocks in H.264; International Conference on Image Processing; 2004; vol. 1; pp. 453-456.
Kim Yangsoo et al.; Fast Mode Decision Algorithm for H.264 Using AZCB Prediction; International Conference on Consumer Eletronics 2006; 2006; pp. 33-34.
Dong-Hau, Liu et al.; A New All-Zero 4X4 Block Determination Rule for Integer Tranform and Quantization in AVS-M Encoder; 2006; vol. 7, sup. 1; pp. 89-94.

* cited by examiner

*Primary Examiner*—Sherali Ishrat
(74) *Attorney, Agent, or Firm*—Trellis IP Law Group (57) ABSTRACT

In one embodiment, a method for bypassing transform and quantization steps in a video compression is provided. The method determines one or more threshold values that are computed for a bypass of the transform and quantization steps. A sum of absolute transformed differences (SATD) value from a motion estimation of a signal being compressed using H.26x is received. The SATD value is compared to at least one of the one or more threshold values. It is then determined if the transform and quantization can be bypassed based on the comparison. For example, if the SATD value is less than the at least one of the one or more threshold values, then it may be determined that the coefficients of the transform are expected to be quantized to zero. Accordingly, the transform and quantization steps may be bypassed.

20 Claims, 3 Drawing Sheets

Fig. 3

BYPASS USING SUM OF ABSOLUTE TRANSFORMED DIFFERENCES VALUE (SATD) IN A VIDEO CODING PROCESS

BACKGROUND

Particular embodiments generally relate to video coding.

Several applications, such as streaming video, video conferencing, etc., transfer moving pictures. The information that is transferred is typically digital video that is represented by information for pixels in a picture. Data transmission lines are often unable to carry uncompressed data for the moving pictures. Thus, data compression is used to compress the data. Typical standards include moving pictures expert group (MPEG)-x and H. 26x standards. Specific examples of standards include MPEG-4, H.264, etc.

In H.264, video data is compressed using a transform step, such as a discrete cosine transform (DCT), and a quantization (Q) step. Also, an inverse transform and inverse quantization may also be performed for motion estimation. These computations are computationally intensive. In some cases, all of the DCT coefficients may be quantized to zero. In this case, the computations may be skipped. In MPEG-4, Sum of Absolute Differences (SAD) values can be used to determine if the computations can be skipped. The SAD value is calculated in the motion estimation calculation of the video coder. However, in H.264, the SAD may not always be used in the motion estimation. When this is the case, the determination of whether the computations can be skipped cannot be performed using the SAD value.

SUMMARY

Particular embodiments generally relate to determining whether a transform step, a quantization step, inverse transform step, and inverse quantization step may be bypassed using a sum of absolute transformed differences (SATD) value. In SAD computations, the original pixel blocks are used. However, in SATD, the original block is processed using Hadamard Transform. The Hadamard-transformed blocks are subtracted to form a SATD value.

In one embodiment, a method for bypassing transform and quantization steps in a video coding is provided. The method determines one or more threshold values that are computed for a bypass of the transform and quantization steps. A sum of absolute transformed differences (SATD) value is obtained from a motion estimation of a signal being compressed using H.26x is received. The SATD value is compared to at least one of the one or more threshold values. It is then determined if the transform and quantization can be bypassed based on the comparison. For example, if the SATD value is less than the at least one of the one or more threshold values, then it may be determined that the coefficients of the transform are expected to be quantized to zero. Accordingly, the transform and quantization steps may be bypassed.

A further understanding of the nature and the advantages of particular embodiments disclosed herein may be realized by reference of the remaining portions of the specification and the attached drawings.

DETAILED DESCRIPTION OF EMBODIMENTS

Figure 1:
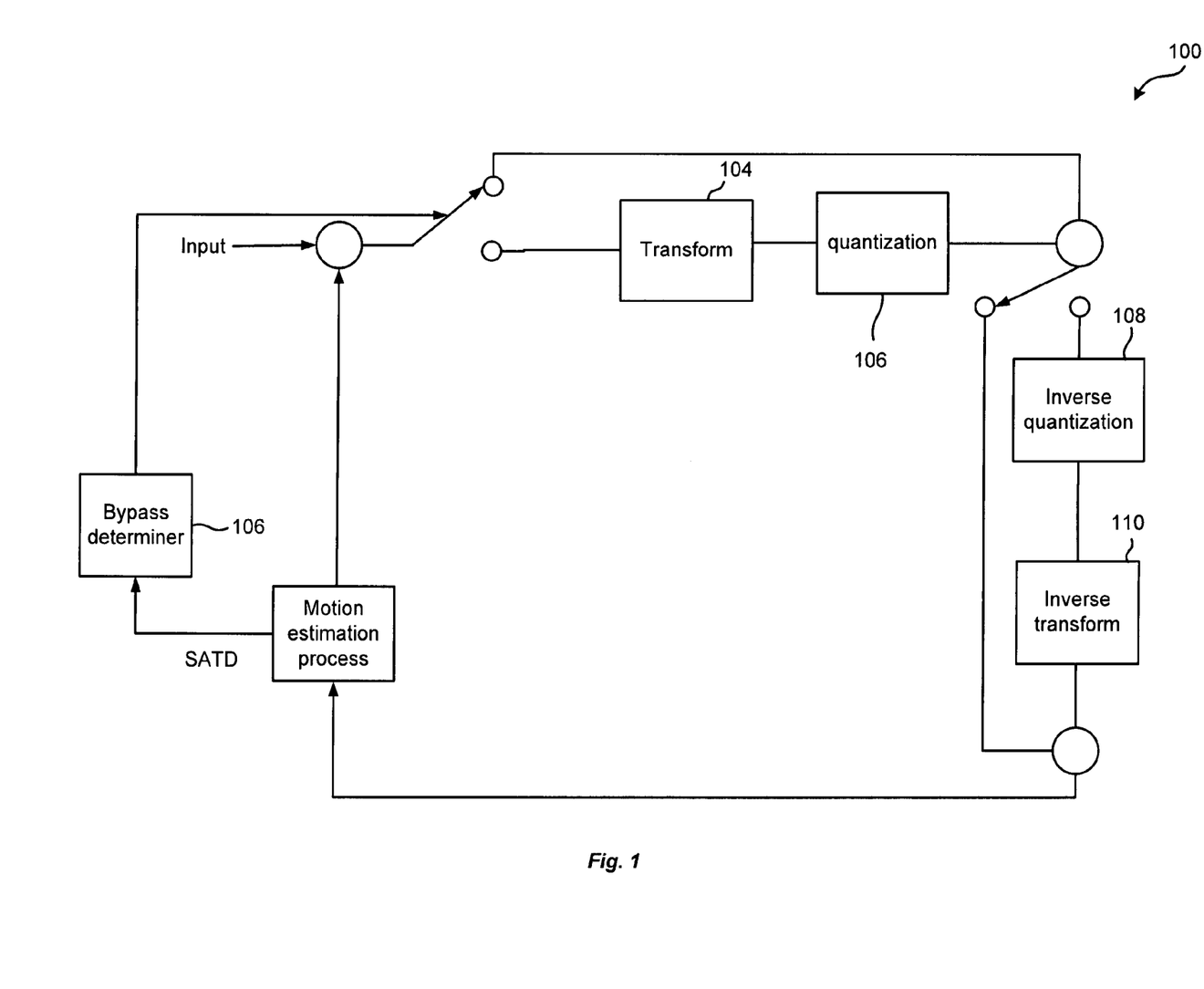
FIG. 1 depicts a simplified system for determining a bypass according to one embodiment of the present invention.

FIG. 1 depicts a simplified encoder 100 for determining a bypass according to one embodiment of the present invention. Encoder 100 includes a bypass determiner 102, a transform module 104, a quantization module 106, an inverse quantization module 108, and an inverse transform module 110.

Transform module 104 may perform a transform of a block of coefficients. For example, a discrete cosine transform (DCT) may be used. Although a DCT is described, it will be understood that other transforms may be used.

A macroblock may be determined from an input frame, such as a 16×16 block pixel representation. A transform block includes coefficients determined from the macroblock. For example, the transform block may be determined by subtracting a current macroblock (or block) from a predicted macroblock to produce a residual or difference macroblock. The transform block may be a variable size representation of the residual or difference block, such as a 4×4 transform block of the 16×16 residual or difference block. Transform module 104 is then configured to transform the transform block.

Quantization module 106 is configured to quantize the transformed block. In this case, the transformed coefficients undergo quantization. The transform coefficients are quantified to a quantization value and coefficients being lower than the lowest decision value are quantified to zero. A person skilled in the art will appreciate the steps performed by transform module 104 and quantization module 106 and they will not be described further.

The coefficients may then be reordered and entropy encoded. The entropy encoded coefficients and other information required to decode the macroblock form a compressed bitstream that can be transmitted and/or stored. The compressed bitstream may then be decoded using a decoder.

A reconstruction is also performed to reconstruct a frame for encoding of further macroblocks. Inverse quantization module 108 may perform an inverse quantization. Inverse transform module 110 may then perform an inverse transform. Modules 108 and 110 perform the reverse operation of transform module 104 and quantization module 106. The result is to restore images such that previous frames can be reconstructed and a motion estimation can be determined. A person skilled in the art will understand the inverse quantization and inverse transform steps in addition to the motion estimation that is performed.

The motion estimation may then be determined. This provides the prediction of a current frame from a reference frame. In calculating the motion estimation, a SATD value is determined. The SATD value may be determined from a difference of the current frame and the reference frame.

Bypass determiner 102 is configured to determine whether transform module 104, quantization module 106, inverse quantization module 108, and/or inverse transform module 110 can be bypassed in a video coding process. In one embodiment, the coding process may be based on a compression standard, such as H.26x. Although H.26x is contemplated, the description will be described using the H.264 standard. However, it will be recognized that other H.26x standards in addition to any other video coding standards may be used with embodiments of the present invention.

H.264 uses a block-based motion compensation model. A macroblock is set to a block having 16×16 pixels and the macroblock can be divided into variable-sized blocks. In one embodiment, a block transform on a 4×4 block (or other size block) is used. Transform coefficients may be determined for the 4×4 block as described above. Thus, the 4×4 pixels are converted into 4×4 transform coefficients. This allows the pixels to be represented by fewer bits than in the pixel representation. Transformation of a 4×4 block results in a transformed block of coefficients. This may include much fewer non-zero values than the original 4×4 pixel block.

A quantization process may then be carried out to further reduce the data representation. For example, more of the transformed block coefficients may be quantized to zero. In some cases, all of the transform coefficients may be zero after the transform and quantization steps.

When all the transform coefficients are expected to be quantized to zero, then the computations performed by transform module 104 and quantization module 106 may be skipped. Additionally, the inverse quantization and transform steps may also be skipped. Bypass determiner 102 is configured to determine when the transform and quantization steps may be skipped.

In one embodiment, bypass determiner 102 receives a SATD value from a motion estimation process 112. In H.264, the motion estimation may use either a sum of absolute difference (SAD) or an SATD value. The SAD and SATD values are used to provide the prediction in the video coding. The motion estimation calculation uses an algorithm based on the SAD or SATD. In one embodiment, the SATD value provides a better prediction and improved video quality than using the SAD value. Accordingly, it might be expected that a video coder may use a SATD-based motion estimation. Thus, bypass determiner 102 is configured to determine the bypass decision based on an SATD value received from the motion estimation. This is different from using an SAD value to determine the bypass decision. In some cases, the SAD value may not be available and thus bypass determiner 102 cannot determine a bypass based on the SAD value.

In one embodiment, one or more threshold values are determined. Bypass determiner 102 then compares the SATD value received from the motion estimation to at least one of the threshold values. For example, threshold values may be computed for each coefficient of the 4×4 block. The SATD may be compared to a threshold value for one of the coefficients to determine if the coefficient may be quantized to zero. In one example, if the SATD value is less than the threshold value, then it is expected that the coefficient may be quantized to zero. Although the comparison may be performed for all coefficients, a generalized threshold may be used to determine if a group of coefficients may be quantized to zero. For example, a single threshold may be determined where if the SATD value is less than this threshold value, it is expected that all coefficients may be quantized to zero. If it is determined that all the coefficients may be quantized to zero, then bypass determiner 102 determines that the transform, quantization, inverse transform, and/or quantization steps may be bypassed.

Figure 2:
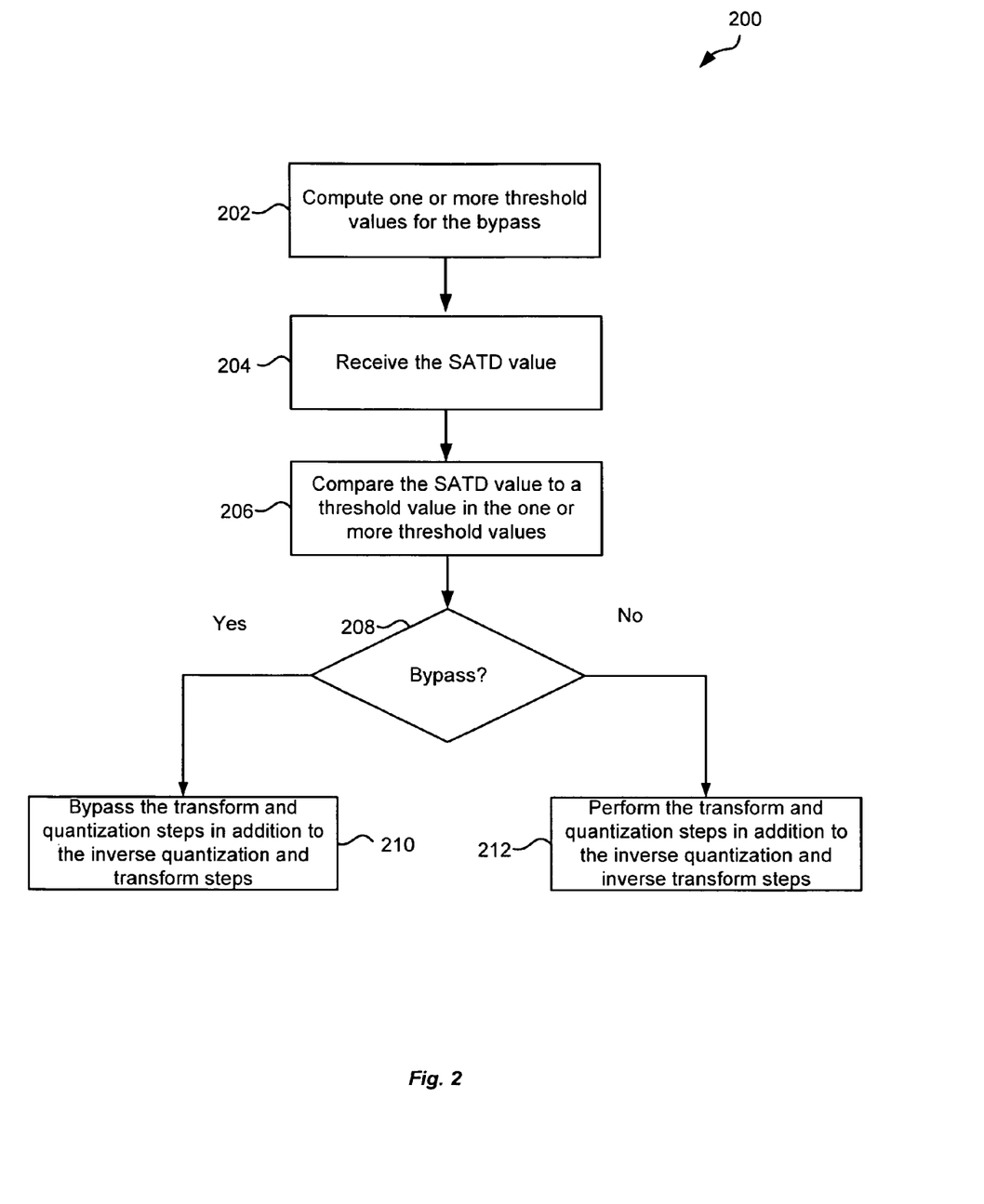
FIG. 2 depicts a simplified flowchart of a method for determining if a bypass should be performed according to one embodiment of the present invention.

FIG. 2 depicts a simplified flowchart 200 of a method for determining if a bypass should be performed according to one embodiment of the present invention. Step 202 computes one or more threshold values for the bypass. The threshold values may be computed based on a quantization parameter and a position of the coefficient. This process is described in more detail below.

Step 204 receives the SATD value. The SATD value may be received from a motion estimation performed during the coding process.

Step 206 compares the SATD value to a threshold value in the one or more threshold values. In one embodiment, the SATD may be compared to each of the one or more threshold values. If the SATD is less than a threshold value, then it can be assumed that the coefficient for the threshold value may be quantized to zero. In another embodiment, one threshold value may be determined from the one or more threshold values and if the SATD is less than this threshold, then it can be assumed that all the coefficients will be quantized to zero.

Step 208 determines if the bypass should be performed. Thus, if the comparison shows that all the coefficients may be quantized to zero, then step 210 bypasses the transform and quantization steps in addition to the inverse quantization and transform steps.

If the SATD does not indicate a bypass should be performed, then step 212 performs the transform and quantization steps in addition to the inverse quantization and inverse transform steps.

Figure 3:
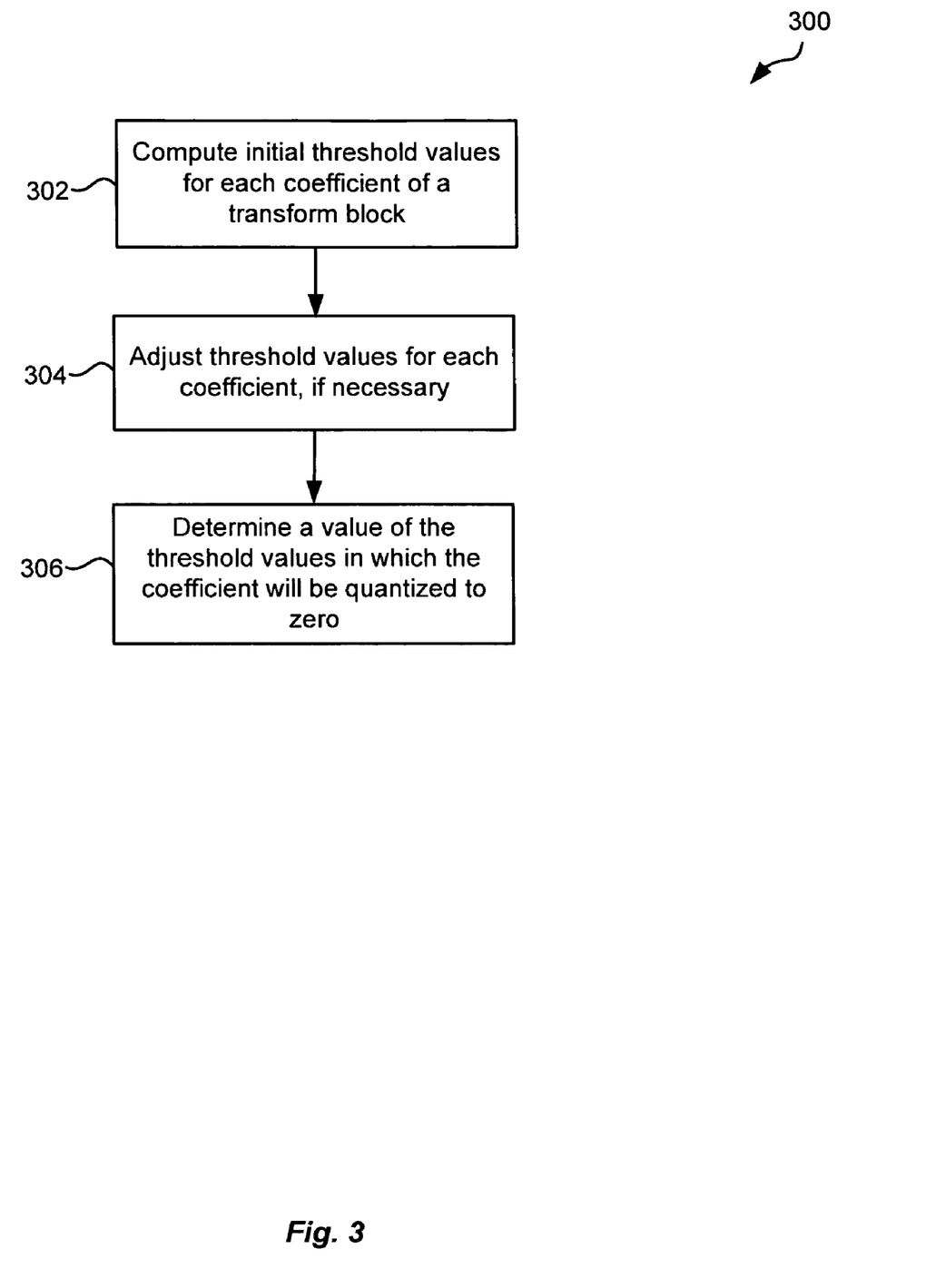
FIG. 3 depicts a simplified flowchart of a method for determining threshold values according to one embodiment of the present invention.

FIG. 3 depicts a simplified flowchart 300 of a method for determining threshold values according to one embodiment of the present invention. Step 302 computes initial threshold values for each coefficient of a transform block. For example, threshold values for a 4×4 transform block may be determined.

Step 304 adjusts threshold values for each coefficient, if necessary. For example, the initial threshold values determined in step 302 may be too tight. Thus, larger values may be allowed where the coefficients may be quantized to zero. For example, the initial values computed in step 302 may be compared to the SATD. However, the SATD may be larger than some of the initial threshold values but the coefficients may still be quantized to zero. Accordingly, a larger threshold value may be used. Step 304 thus may determine the larger threshold values for each coefficient.

Step 306 then determines a value out of all the threshold values in which all the coefficients will be quantized to zero. For example, the lowest value may be determined. This threshold value may be used to determine if all the coefficients may be quantized to zero using one comparison. Thus, when an SATD value is received, it will be compared to this threshold value. If the SATD is less than this value, then it is determined that all the coefficients are quantized to zero. The lowest value is chosen because if the SADT is lower than this value, then it will be lower than all of the other threshold values. Thus, the bypass calculation can be simplified.

Determination of Threshold Values

The following describes an embodiment of a process for determining threshold values.

SATD

The SATD is a sum of absolute difference of Hadamard transform coefficients. The SATD of X is defined as the sum of absolute Hadamard transform difference as the following:

$$SATD = \sum_i \sum_j |y_{ij}| \quad (1)$$

where $X=\{x_{ij}|i\in[0,3], j\in[0,3]\}$ 4×4 residual signal
$Y=\{y_{ij}|i\in[0,3], j\in[0,3]\}$ 4×4 Hadamard Transformed signal $$H = \begin{bmatrix} 1 & 1 & 1 & 1 \\ 1 & 1 & -1 & -1 \\ 1 & -1 & 1 & -1 \\ 1 & -1 & -1 & 1 \end{bmatrix} \text{Hadamard Transform Matrix} \quad (2)$$

As shown in equation (1), the SATD is the sum of absolute difference of Hadamard transform coefficients. Although the Hadamard transform is described, it will be understood that other transforms may be used. The Hadamard transform is defined as:

$$y = HXH^T \quad (3)$$

From equations (2) and (3) the Hadamard transform has the following properties:

Property 1

$$HH^T = 4I \quad (4)$$

Property 2

$$X = \frac{1}{16} HYH^T \quad (5)$$

Thus, from equation (1), a proof yields:
From Eq (1), $HYH^T = H(HXH^T)H^T = (HH)X(HH)^T = (4I)X(4I)^T = 16X$ The properties described in equation (5) can be re-written in a component-wise form as the following:

$$|x_{ij}| = \left| \frac{1}{16} \sum_{n=0}^{3} \sum_{m=0}^{3} h_{in} y_{nm} h_{jm} \right| \leq \frac{1}{16} \sum_{n=0}^{3} \sum_{m=0}^{3} |h_{in} y_{nm} h_{jm}| = \quad (6)$$

$$\frac{1}{16} \sum_{n=0}^{3} \sum_{m=0}^{3} |h_{in}||y_{nm}||h_{jm}|$$

An SATD relationship with the Hadamard transform coefficients may then be determined. As seen in equation (2), absolute value of $|h_{in}| = 1$ for all I and n. Based on this, the relationship of Hadamard transform coefficient may be the following:

$$|x_{ij}| \leq \frac{1}{16} \sum_{n=0}^{3} \sum_{m=0}^{3} |y_{nm}| = \frac{1}{16} SATD \quad (7)$$

The above equation indicates that the absolute value of each pixel coefficient ($x_{ij}$) is always less than 1/16 of the SATD value. Once the SATD value is known, then the original pixel value should be less than this value.

Transform Process

Given the SATD, the following process explains the maximum value of a transform coefficient that if quantization is applied to this coefficient, then the output would be zero. Thus, if every coefficient is above this value, then it can be determined that all coefficients would be quantized to zero. The maximum transform coefficient is determined based on the SATD. The transform may be expressed in matrix and component-wide forms as the following:

$$W = CXC^T \text{ Matrix Format} \quad (8)$$

$$w_{ij} = \sum_{m} \sum_{n} c_{im} x_{mn} c_{jn} \text{ Component-wise Format where} \quad (9)$$

where $$C = \begin{bmatrix} 1 & 1 & 1 & 1 \\ 2 & 1 & -1 & -2 \\ 1 & -1 & -1 & 1 \\ 1 & -2 & 2 & -1 \end{bmatrix}$$

The upper boundary of the absolute value of equation (9) can be obtained as:

$$|w_{ij}| = \left| \sum_{m} \sum_{n} c_{im} x_{mn} c_{jn} \right| \leq \sum_{m} \sum_{n} |c_{im}||x_{mn}||c_{jn}| = \quad (10)$$

$$c_i^{\max} c_j^{\max} \sum_{m} \sum_{n} |x_{mn}|$$

where $c_i^{\max} = \max |c_{im}|$ for all $m$.

Note that $c_i^{\max} = \{1, 2\}$.

By combining equations (7) and (10), the following equation is determined:

$$|w_{ij}| \leq c_i^{\max} c_j^{\max} \sum_{m} \sum_{n} |x_{mn}| \leq c_i^{\max} c_j^{\max} \sum_{m} \sum_{n} \left( \frac{1}{16} SATD \right) \quad (11)$$

The SATD may be independent of the position, m and n and thus, the following equation may be determined for the transform coefficients:

$$|w_{ij}| \leq c_i^{\max} c_j^{\max} \sum_{m} \sum_{n} \left( \frac{1}{16} SATD \right) = \quad (12)$$

$$c_i^{\max} c_j^{\max} \cdot 16 \left( \frac{1}{16} SATD \right) = c_i^{\max} c_j^{\max} \cdot SATD$$

Equation (12) can be used to determine the maximum value of the transform coefficient ($w_{ij}$) that if quantization is applied to this maximum value, then the output would be zero. As shown in Equation (12), the possible maximum coefficient after the Transform equals the maximum values in maximum transform constants in i- and j-direction as defined in Equation (9) multiplied by SATD.

Quantization Process

The next process determines a maximum value for the SATD from which it can be determined that the transform coefficient will be quantized to zero. The quantization in H.264 may be defined as:

$$|z_{ij}| = (|w_{ij} QP_j| \cdot m + f) >> b \quad (13)$$

where $b = 15 + (QP/16)$ $m = f(QP \% 6, i, j)$ $$f = \begin{cases} 2^{b/3} & \text{for intra} \\ 2^{b/6} & \text{for inter} \end{cases}$$

$Z_{ij}$ may be the absolute value of the quantization. If the absolute value of $z_{ij}$ is less than 1, then the coefficient will be quantized to be zero. This is expressed as:

$$\frac{(|w_{ij}| \cdot m + f)}{2^b} < 1 \qquad (14)$$

From equation (14), the magnitude range of the transform coefficient that can quantized to zero may be expressed as:

$$|w_{ij}| < \frac{2^b - f}{m} \qquad (15)$$

From equations (12) and (15), the condition that a transform coefficient is quantized to zero may be expressed as:

$$|w_{ij}| \le c_i^{max} c_j^{max} \cdot SATD < \frac{2^b - f}{m} \qquad (16)$$

$$SATD < \frac{2^b - f}{c_i^{max} c_j^{max} \cdot m} \qquad (17)$$

From equation (17), if the SATD is less than $$\frac{2^b - f}{c_i^{max} c_j^{max} \cdot m},$$

the transform coefficient of $w_{ij}$ will be quantized to be zero. Thus, once the value of $$\frac{2^b - f}{c_i^{max} c_j^{max} \cdot m}$$

is known in every position of a 4×4 block, the threshold of the SATD can be determined that indicates that coefficient will be quantized to zero. The thresholds may be different based on the quantization parameter used. The quantization parameter may be dependent on the bit rate used in the coding process.

Threshold Determination Method

Equation (17) can be used to determine a bypass method. If the SATD is less than the value of the right-hand side of equation (17), it may be determined that a coefficient for a position in a 4×4 block will be quantized to zero. However, the upper bound may be too tight in the sense that the threshold boundary is too small to obtain good performance. For example, the threshold may be too low such that some SATD values higher than the threshold may also have their coefficients quantized to zero. Accordingly, the following process may be used to determine different threshold values. By exploiting the properties of the Hadamard transform, a higher threshold may be obtained. From equations (4) and (8), the following may be calculated:

$$W = CXC^T = C\left(\frac{H^T H}{4}\right)X\left(\frac{H^T H}{4}\right)C^T = \left(\frac{1}{16}\right)CH^T(HXH^T)HC^T = \left(\frac{1}{16}\right)D(HXH^T)D^T \qquad (18)$$

$$\text{where } D = CH^T = \begin{bmatrix} 4 & 0 & 0 & 0 \\ 0 & 6 & 2 & 0 \\ 0 & 0 & 0 & 4 \\ 0 & -2 & 6 & 0 \end{bmatrix} \qquad (19)$$

Equation (18) may be expressed as component-wise form as:

$$|w_{ij}| = \left|\frac{1}{16}\sum_n \sum_m d_{in} y_{nm} d_{jm}\right| \le \qquad (20)$$
$$\frac{1}{16}\sum_n \sum_m |d_{in}||y_{nm}||d_{jm}| \le \frac{1}{16} d_i^{max} d_j^{max} \sum_n \sum_m |y_{nm}|$$

where $d_i^{max} = \max|d_{im}|$ for all $m$.

Therefore $$|w_{ij}| = \frac{d_i^{max} d_j^{max}}{16} SATD \qquad (21)$$

From equation (21), a condition that the coefficient is quantized to be zero may be:

$$\frac{d_i^{max} d_j^{max}}{16} SATD < \frac{2^b - f}{m} \qquad (22)$$

$$SATD < \left(\frac{2^b - f}{\left(\frac{d_i^{max} d_j^{max}}{16}\right) \cdot m}\right)$$

Since $d_i^{max} = \{4,6\}$, from equation (19), i.e., the max values in each row are 4 and 6. Equation (22) provides a larger threshold than that found in equation (17). Thus, more zero quantized coefficients may be detected.

Threshold Determination

Equation (22) may be a function of the quantization parameter and position of the transform coefficient. A threshold may be determined for each quantization parameter that may be used. For example, when the quantization parameter equals 31, the threshold for each coefficient of the 4×4 matrix may be the following:

TABLE 1

| (Threshold Table for QP = 31) | | | |
|---|---|---|---|
| 66.67 | 72.22 | 66.67 | 72.22 |
| 72.22 | 74.08 | 72.22 | 74.08 |
| 66.67 | 72.22 | 66.67 | 72.22 |
| 72.22 | 74.08 | 72.22 | 74.08 |

As shown in Table 1, threshold values for each position of a coefficient may be determined. The SATD may be compared to the threshold values found in each position. If the SATD is less than a value found in one of the positions, then it can be determined that that coefficient will be quantized to zero.

The comparison of the SATD to every threshold value may be computationally expensive, however. For example, using software to perform the comparison involves a computational branch. In one embodiment, instead of checking each individual coefficient to determine if it will be quantized to zero, one threshold value may be determined in which if the SATD is less than this threshold value, then it can be determined that all the coefficients will be quantized to zero.

Using the values in Table 1, the lowest value is 66.67. If we want to use an integer value, this may be rounded up to 67. If the SATD value is less than 67, then it can be determined that the SATD value will be less than all of the threshold values in Table 1. Accordingly, it can be determined that all the coefficients may be quantized to zero. Thus, a minimum value from all the threshold values may be determined. The minimum value may then be used to determine if all the coefficients will be quantized to zero. Also, a single value does not have to be used. For example, a value for a group of coefficients may be used. In one example, the lowest value in each column may be determined. The SATD can be compared to this value to determine if the coefficients in the column will be quantized to zero. This computation can be performed for each column. This would cut down on the number of computations also.

The above method may be used to handle all of the possible quantization parameter values. These thresholds may be computed based on all the quantization parameters. Table 2 shows the threshold value that may be computed based on the quantization parameter.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials,

TABLE 2

| | QP | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| SAD | 2 | 2 | 2 | 2 | 3 | 3 | 3 | 3 | 4 | 4 | 5 | 5 | 6 | 6 | 7 | 8 | 9 |
| SATD | 3 | 3 | 3 | 3 | 4 | 4 | 5 | 5 | 6 | 6 | 7 | 8 | 9 | 10 | 11 | 12 | 14 |
| | QP | | | | | | | | | | | | | | | | |
| | 18 | 19 | 20 | 21 | 22 | 23 | 24 | 25 | 26 | 27 | 28 | 29 | 30 | 31 | 32 | 33 | 34 |
| SAD | 10 | 11 | 12 | 14 | 15 | 17 | 19 | 21 | 24 | 27 | 30 | 33 | 38 | 42 | 47 | 53 | 60 |
| SATD | 15 | 17 | 19 | 22 | 24 | 27 | 30 | 34 | 37 | 44 | 47 | 54 | 60 | 67 | 74 | 87 | 94 |
| | QP | | | | | | | | | | | | | | | | |
| | 35 | 36 | 37 | 38 | 39 | 40 | 41 | 42 | 43 | 44 | 45 | 46 | 47 | 48 | 49 | 50 | 51 |
| SAD | 66 | 76 | 84 | 94 | 105 | 120 | 131 | 152 | 167 | 188 | 209 | 240 | 261 | 303 | 334 | 376 | 417 |
| SATD | 107 | 120 | 134 | 147 | 174 | 187 | 214 | 240 | 267 | 294 | 347 | 374 | 427 | 480 | 534 | 587 | 694 |

Accordingly, a determination if the transform and quantization steps can be bypassed is provided. The bypass is determined based on using the SATD value that is determined from the motion estimation calculation. The threshold values are determined based on the quantization parameter and position of a transform coefficient. The SATD can be compared to a threshold value to determine if it will be quantized to zero. Further, the SATD can be compared to one threshold value to determine if all coefficients will be quantized to zero. The bypass may then be performed if it is determined that all coefficients will be quantized to zero. Accordingly, the bypass may be determined in an efficient manner.

Although the description has been described with respect to particular embodiments thereof, these particular embodiments are merely illustrative, and not restrictive. For example, video coding standards may be appreciated other than H.26x may be used.

or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semi-conductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method for bypassing a transform step and a quantization step in video coding process, the method comprising:
   determining one or more threshold values computed for a bypass of the transform and quantization steps;
   receiving a sum of absolute transformed differences (SATD) value from a motion estimation of information in the video coding process;
   comparing the SATD value to at least one of the one or more threshold values; and
   determining if the transform and quantization steps can be bypassed based on the comparison.

2. The method of claim 1, wherein determining the one or more threshold values comprises determining a threshold value for each coefficient for the transform.

3. The method of claim 2, wherein the threshold value for each coefficient is determined based on a quantization parameter and a position of each coefficient.

4. The method of claim 3, wherein the threshold value substantially is determined by Transform coefficients and Quantization Parameters.

5. The method of claim 2, further comprising determining a second set of one or more threshold values that allow the SATD to predict the bypass more frequently than if the determined one or more threshold values are used.

6. The method of claim 5, wherein the threshold value may be further adjusted to determine more coefficients that are quantized to zero.

7. The method of claim 1, further comprising determining a single value from the one or more threshold values in which it can be determined that the transform and quantization can be bypassed based on the single value.

8. The method of claim 1, wherein the bypass is determining when all coefficients for the transform may be quantized to zero if the transform and quantization steps were performed.

9. The method of claim 1, further comprising bypassing inverse transform and inverse quantization steps based on the comparison.

10. An apparatus configured to determine a bypass of a transform step and a quantization step in video coding process, the apparatus comprising:
    one or more processors; and
    logic encoded in one or more tangible media for execution by the one or more processors and when executed operable to:
    determine one or more threshold values computed for a bypass of the transform and quantization steps;

receive a sum of absolute transformed differences (SATD) value from a motion estimation of information in the video coding process;

compare the SATD value to at least one of the one or more threshold values; and determine if the transform and quantization steps can be bypassed based on the comparison.

11. The apparatus of claim 10 wherein the logic when executed is further operable to determine a threshold value for each coefficient for the transform.

12. The apparatus of claim 11, wherein the threshold value for each coefficient is determined based on a quantization parameter and a position of each coefficient.

13. The apparatus of claim 12, wherein the threshold value substantially is determined by Transform coefficients and Quantization Parameters.

14. The apparatus of claim 11, wherein the logic when executed is further operable to determine a second set of one or more threshold values that allow the SATD to predict the bypass more frequently than if the determined one or more threshold values are used.

15. The apparatus of claim 14, wherein the threshold value may be further adjusted to determine more coefficients that are quantized to zero.

16. The apparatus of claim 10, wherein the logic when executed is further operable to determine a single value from the one or more threshold values in which it can be determined that the transform and quantization can be bypassed based on the single value.

17. The apparatus of claim 10, wherein the bypass is determining when all coefficients for the transform may be quantized to zero if the transform and quantization steps were performed.

18. The apparatus of claim 10, wherein the logic when executed is further operable to bypass inverse transform and inverse quantization steps based on the comparison.

19. An apparatus configured to determine a bypass of a transform step and a quantization step in video coding process, the apparatus comprising:

means for determining one or more threshold values computed for a bypass of the transform and quantization steps;

means for receiving a sum of absolute transformed differences (SATD) value from a motion estimation of information in the video coding process;

means for comparing the SATD value to at least one of the one or more threshold values; and means for determining if the transform and quantization steps can be bypassed based on the comparison.

20. The apparatus of claim 19, wherein the means for determining the one or more threshold values comprises means for determining a threshold value for each coefficient for the transform.

* * * * *